United States Patent
Maher et al.

(10) Patent No.: US 10,532,502 B2
(45) Date of Patent: Jan. 14, 2020

(54) CONTAINER AND LABEL

(71) Applicant: Ecomarks Plastics, LLC, Mt. Pleasant, SC (US)

(72) Inventors: Michael Sean Maher, Mt. Pleasant, SC (US); Lisa Elizabeth Latimer, Ramona, CA (US)

( * ) Notice: Subject to any disclaimer, the term of this patent is extended or adjusted under 35 U.S.C. 154(b) by 0 days.

(21) Appl. No.: 15/849,726

(22) Filed: Dec. 21, 2017

(65) Prior Publication Data

US 2018/0111296 A1 Apr. 26, 2018

Related U.S. Application Data

(63) Continuation of application No. 15/066,873, filed on Mar. 10, 2016, which is a continuation-in-part of application No. 14/492,242, filed on Sep. 22, 2014, now abandoned.

(51) Int. Cl.
| | | |
|---|---|---|
| *B29C 45/16* | (2006.01) | |
| *B65D 25/20* | (2006.01) | |
| *G09F 3/00* | (2006.01) | |
| *B29K 101/12* | (2006.01) | |
| *B29L 31/00* | (2006.01) | |
| *G09F 3/02* | (2006.01) | |

(52) U.S. Cl.
CPC ........ *B29C 45/1679* (2013.01); *B65D 25/205* (2013.01); *G09F 3/0288* (2013.01); *B29K 2101/12* (2013.01); *B29L 2031/712* (2013.01); *G09F 2003/0208* (2013.01); *G09F 2003/0272* (2013.01)

(58) Field of Classification Search
CPC ............... B29C 45/16; B29C 45/1642; B29C 2045/1653; B29C 2045/1656; B29C 2045/1673
See application file for complete search history.

(56) References Cited

U.S. PATENT DOCUMENTS

| | | | |
|---|---|---|---|
| 5,604,006 A | 2/1997 | Ponchaud et al. | |
| 5,833,790 A * | 11/1998 | Hare | B41M 5/035 156/240 |
| 6,378,906 B1 * | 4/2002 | Pennaz | C09D 11/50 106/31.32 |
| 7,140,857 B2 | 11/2006 | Graham | |
| 7,240,443 B2 | 7/2007 | Nathanson et al. | |
| 2004/0238547 A1 | 12/2004 | Tyra et al. | |
| 2005/0229449 A1 * | 10/2005 | Shepley | G09F 3/20 40/306 |
| 2006/0207961 A1 * | 9/2006 | Kurtz | B65D 1/0223 215/382 |

(Continued)

FOREIGN PATENT DOCUMENTS

JP 2009263006 * 11/2009

*Primary Examiner* — Stella K Yi
(74) *Attorney, Agent, or Firm* — B. Craig Killough; Barnwell Whaley Patterson & Helms

(57) ABSTRACT

The present invention is a container having a label that is embedded in the container and a method of temporarily marking the container over the label. The container is sufficiently transparent to allow indicia formed on the label to be ascertained through a wall of the container. The exterior wall of the container may be written upon with a marker that leaves marks that are erasable from the exterior of the container. A method of producing the container is described.

15 Claims, 5 Drawing Sheets

(56) References Cited

U.S. PATENT DOCUMENTS

| | | |
|---|---|---|
| 2007/0071971 A1 | 3/2007 | Drogan |
| 2009/0294499 A1 | 12/2009 | McKinney et al. |
| 2010/0066502 A1* | 3/2010 | Giraud .............. B29C 45/14491 340/10.1 |
| 2011/0274867 A1* | 11/2011 | Pohlmann ........... B29C 45/1671 428/67 |
| 2015/0299490 A1* | 10/2015 | Storch .................... C09D 13/00 401/68 |
| 2016/0196770 A1 | 7/2016 | Maher et al. |

* cited by examiner

CONTAINER AND LABEL

This application is a continuation of the continuation in part application Ser. No. 15/066,873 filed Mar. 10, 2016, which claims the benefit of application Ser. No. 14/492,242 filed Sep. 22, 2014.

FIELD OF THE INVENTION

This invention relates to containers, marking of containers, and methods of producing containers.

BACKGROUND OF THE INVENTION

It is common to label containers to indicate contents. Some containers are reusable, which means that a new label must be applied when the contents of the container are changed or information on the label must otherwise be updated. Repeatedly changing the information on the label can lead to problems with removing the label and/or otherwise relabeling the container.

In one particular situation, health departments, other governmental organizations, or organizational Best Operating Practices require restaurants to label food containers. A label may identify the food contained in the container, as well as provide information about freshness, quality assurance, and safety of the contained food. In this manner, cross contamination is inhibited, and the expected shelf life of the food before expiration may be determined by food preparers and health department inspectors.

However, a health department may require that the label be renewed periodically, and even as frequently as each day. Relabeling means removing the expired marked label and replacing it with a new marked label. Labels known in the art, which are used for this process, can be difficult to remove from the container, and become unreadable in high moisture areas, such as walk-in food coolers and freezers. Labels known in the art are difficult to remove, and may leave an adhesive residue on the container that is considered a violation of state health codes. The labeling system of the present invention may help resolve these problems by permanently embedding into the container and providing spaces to record information about the food with an erasable marker.

Labels known in the art typically utilize an adhesive that sticks to the container. The label must be peeled off for every change in container content or after a predetermined period. This leaves adhesive on the container, which can contain bacteria. Additionally, the labels known in the art should receive a single marking, without crossing out the prior marking and/or writing on the edges of the label, which may lead to confusion regarding the information.

SUMMARY OF THE INVENTION

The present invention is a container having a label that is embedded in the container. The container is sufficiently transparent to allow the indicia of the label to be ascertained through a wall of the container. The exterior wall of the container may be written upon with a marker that leaves marks that are erasable from the exterior of the container. A method of producing the container is also described.

DESCRIPTION OF PREFERRED EMBODIMENTS

Figure 1:
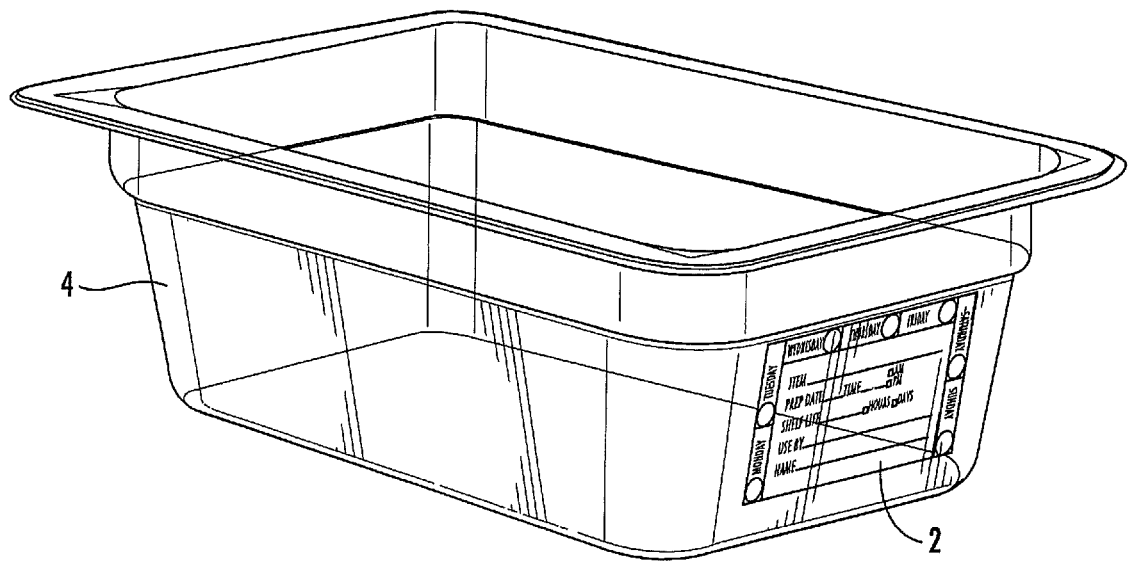
FIG. 1 is a perspective view of a container according to a preferred embodiment of the invention.

In a preferred embodiment, a label 2 is permanently embedded in a container 4, which may be a food container. The label may be reused for identifying container contents, and the conditions, age, or other information about the container contents. The label remains integrated into the container, such that repetitive removal and manipulation of the label relative to the container for remarking the label is not necessary. In essence, the label records parameters and information about the contents of the container without requiring manipulation of the label or remarking the same label by direct contact with a marker. The label may also receive a removable or erasable mark through an erasable marker. The marks may include at least one parameter containing information about container content. Because of the permanent attachment of the label and the container, and the capacity to erase and rewrite indicia on the label, the need for the removable labels known in the art is negated, or at least minimized.

In some embodiments, the container 4 may be a plastic food container, and may be used to store food in a cooler. The label 2 may include a plurality of lines or spaces that receive erasable marks from a marker. At least one parameter marked on the lines or spaces may include information pertinent to the identification, shelf life, and preparation time for the food, and also include a preparer identification. In one embodiment, the parameter includes information about the container content, including, expiration information, container content, and preparer information. Because the label is permanently embedded into the container and the marks on the label are erasable, the label does not have to be removed daily for marking new information thereto. This capacity to repetitively use the label without physically detaching it from the container may help reduce costs and labor associated with replacing the label in every instance the container is changed.

In some embodiments, the label may embed between an inner wall 10 and an outer wall 12 of the container 4. The integration of the label into the container may help eliminate the need to repetitively replace the label after use, or after new container content is stored in the container. In some embodiments, the label may be configured to receive erasable markings from a marker, such as a nonpermanent ink marker, or wax marker such as a grease pencil, also known as a wax pencil, china marker or chinagraph pencil. The use of erasable marking further enhances the use of the label by providing a clear space every time new markings must be written. Additionally, the label may include a plurality of spaces for marking at least one parameter pertinent to the container contents.

The pluralities of spaces are configured to receive marking for at least one parameter. The parameter may include time and dates that can show the expiration times for the container content. In one embodiment, a week's worth of parameters may be marked into the spaces. After the week is completed, the marks may be removed by washing them off with a liquid or rubbing them off, depending upon the marking device that is used. Thereafter, a subsequent week, with possibly different container contents, may be stored and have the parameters identified using the same label. This is accomplished without repetitively replacing labels or remarking the same printed label.

In an additional example of the parameters that can be marked and displayed from the plurality of spaces, at least one daily space identifies a date the container content is placed in said container; a content identification space identifies the container content, a preparation parameter space identifies a date and a time of preparation of the container content, a shelf life space identifies a shelf life for the container contents; an expiration space identifies an expiration date for the container content; and a preparer identification space identifies a preparer of the container content.

FIG. 1 illustrates detailed perspective views of an exemplary labeling system, with an exemplary label embedded into the container, in accordance with an embodiment of the present invention. A label 2 is joined with a container 4. The label and the container may be permanently joined together. In this manner, the label may be reused for identifying and describing different container contents every time the container contents are changed, or after predetermined time duration has passed.

Figure 7A:
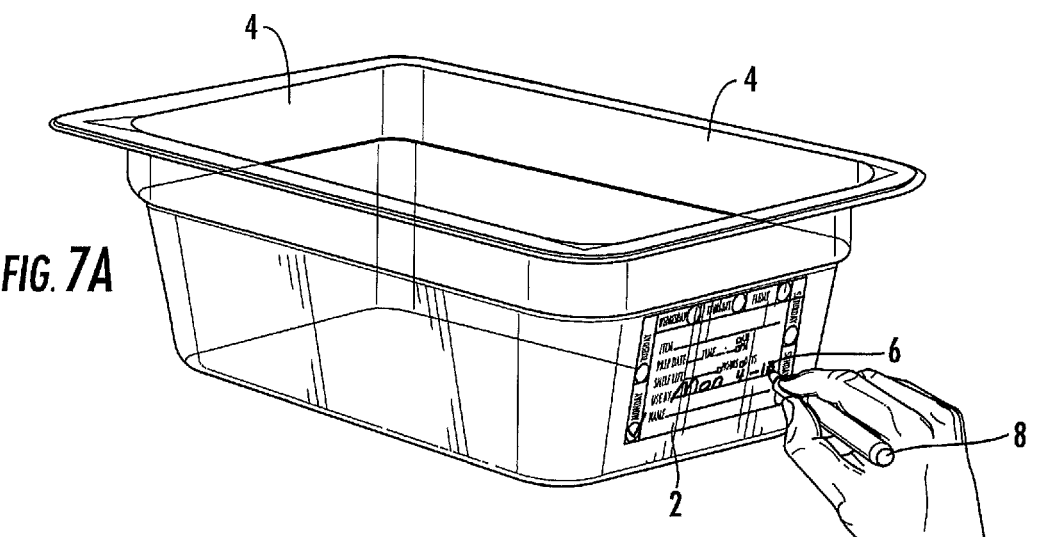
FIG. 7A shows a step of a marker applying erasable indicia on an exterior wall of the container and over the embedded label.

The label 2 may receive erasable marks 6 from an erasable marker 8. FIG. 7A. The marks may include at least one parameter containing information about container contents. Because of the permanent embedding of the label 2 in the container 4, and the capacity to erase and rewrite marks on the label, the need for adhesive backed or pressure sensitive labels known in the art is negated, or at least minimized.

The outer wall 12 of the container 4 is preferred to have a smooth, flat surface that will receive readable marks 6 from the marker 8 that may also be erased. The container is preferred to be formed of a material that will display the markings without smearing when exposed to wet environments, such as those environments that occur in kitchens and coolers. Grease pencils tend to resist exposure to water, and marks from a grease pencil are received and displayed by most plastics, including thermoplastics, and including polycarbonate. Grease pencil marks may be removed from most smooth plastic surfaces by rubbing with a cloth.

Materials for the label may include, without limitation, paper, polymer, textile, metal. However, in a preferred embodiment, the label is formed of a thermoplastic, such as LEXAN®. The label may be formed in layers, so that a layer of thermoplastic is over a layer that forms a substrate for receiving the printed indicia. Other layers may be provided, such as a layer behind the printing receiving layer or layers, or other protective layers. In some embodiments, the label 2 may be a planar member. The label may have various shapes, including, without limitation, rectangle, square, circle, oval, and pyramid. The indicia is permanently printed or formed on the label, and is particularly permanent after embedding the label between container walls.

In some embodiments, the label may embed between an inner portion or inner wall 10 and an outer portion or outer wall 12 of the container. The integration of the label into the container may help eliminate the need to repetitively replace the label after a period of time or after each new container content is stored in the container. In some embodiments, the label may record at least one parameter about the container contents for a period of time, such as one week. The container may include a plastic food container used to store food in a cooler. In a preferred embodiment, the plastic food container is formed of a material that cures to be sufficiently transparent to read the label through a layer or wall of the material. Preferred materials for forming the container are thermoplastics, such as polycarbonate. However, other suitable materials may include, without limitation, NSF plastics, polyurethane, polyethylene, clear polymers and other materials that may be formed by injection molding and are sufficiently transparent to meet the goals of the invention as described herein.

The label may include a plurality of lines or spaces such as those shown in the drawings over which erasable marks from a marker may be applied to the container. At least one parameter marked on the spaces may include information pertinent to the identification, shelf life, and preparation time for the food, and also include a preparer identification. In some embodiments, the pluralities of spaces or lines are configured to receive marking for parameters. The parameters include time and dates that can show the expiration times for the container content.

Figure 7B:
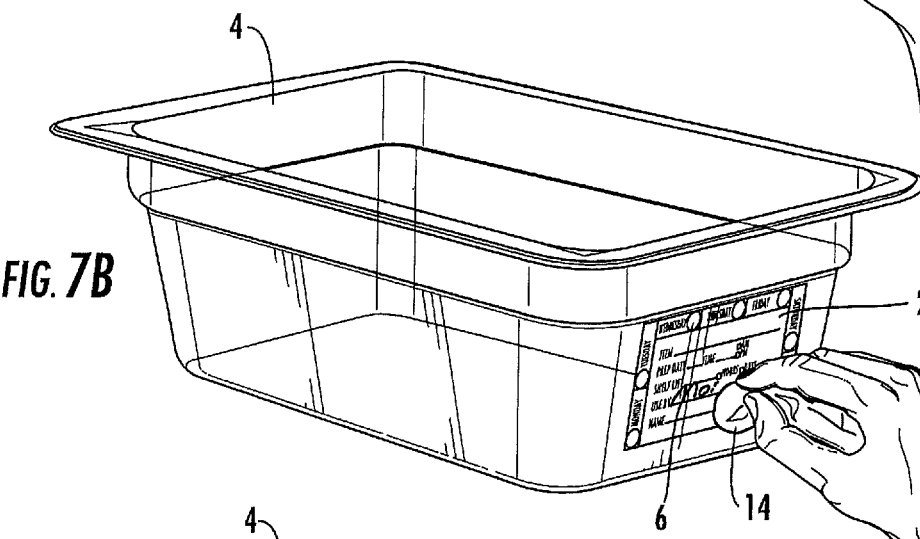
FIG. 7B shows a step of a erasing the erasable indicia from the exterior wall of the container.
Figure 7C:
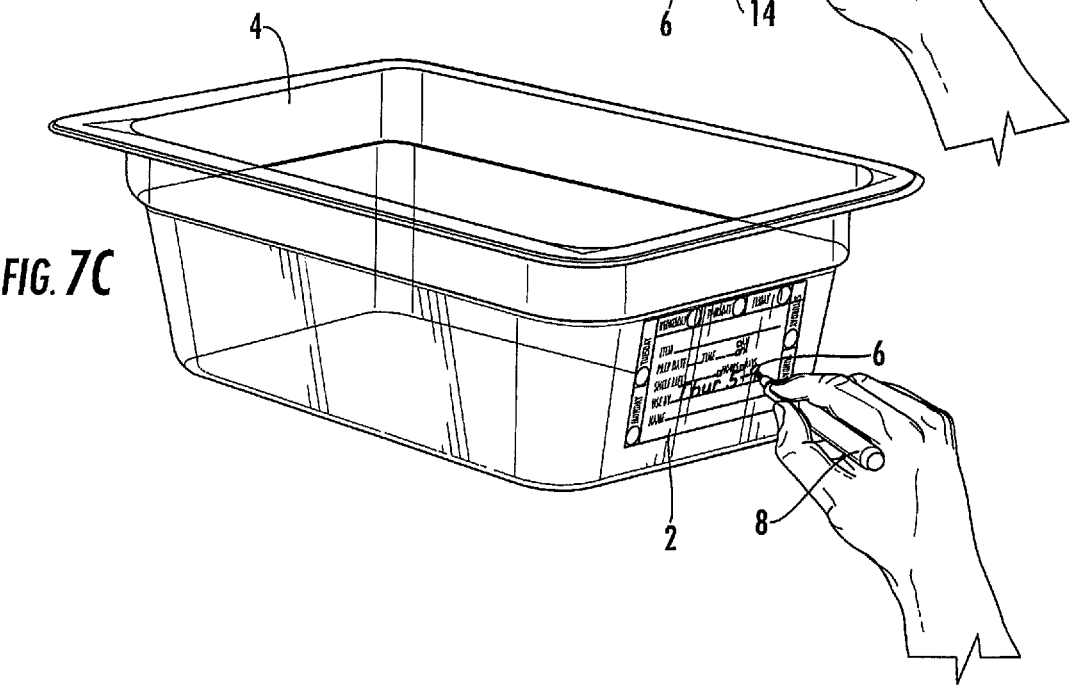
FIG. 7C shows a step of a marker applying erasable indicia on an exterior wall of the container and over the embedded label after the erasable indicia is erased.

By way of example but not limitation, a week's worth of parameters regarding the contents may be marked on the container 4 over the label spaces. After the week is completed, the marks 6 may be removed by washing them off with a liquid or rubbed off with a cloth 14, depending upon the type of marker used. FIG. 7B. Thereafter, a subsequent week, with possibly different container contents, may be stored and have the parameters identified using the same label 2 by applying marks 6 with an erasable marker 8. This is accomplished without repetitively replacing labels or remarking the same printed label. The at least one parameter includes information about the container in a time prior or weekly period. Because of the greater time period and other information marked into the spaces, the label does not have to be removed periodically for marking new information thereto. This capacity to repetitively use the label without physically detaching it from the container may help reduce costs and labor associated with replacing the label in every instance the container is changed.

Figure 8:
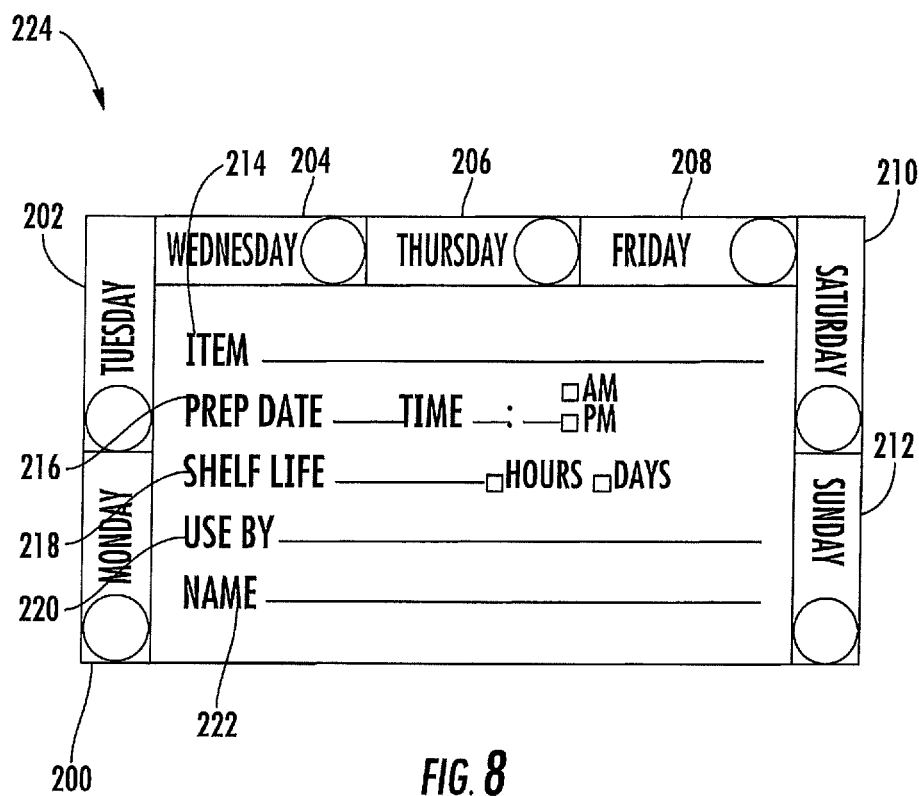
FIG. 8 illustrates a frontal view of an exemplary label having a plurality of spaces for identifying contents of the container.

FIG. 8 illustrates a frontal view of an exemplary label having a plurality of spaces for identifying contents of the container, in accordance with an embodiment of the present invention. In the present invention, a label 2 may include a planar member configured to locate marks from a marker, and display marks formed on an at least partially transparent container. The label may include a plurality of lines or spaces configured to locate a mark from the marker. The label may be configured to locate erasable marks 6 from a marker 8, such as a nonpermanent ink marker. However, in other embodiments, useful markers may include a grease pencil, erasable ink, a crayon, chalk, detachable text and numbers, and any partially removable or erasable mark. The use of erasable marking further enhances the use of the label by providing a clear space every time new markings must be written. The erasable marking forms temporary indicia on the container, which may be erased, and new temporary indicia applied by the erasable marker.

In some embodiments, the plurality of spaces comprises at least one parameter pertinent to the container contents. The spaces may provide an area over which to mark the time, week, duration, contents, and food preparer's information. In one embodiment, a week's worth of parameters may be marked into the spaces. After the week is completed, the marks may be removed by washing or rubbing, depending upon the type of non-permanent marker used. Thereafter, a subsequent week, with possibly different container contents, may be stored and have the parameters identified using the same label. However, in other embodiments, the parameters may cover anywhere from a day, a month, or longer.

In some embodiments, the at least one parameter may include at least one daily space that identifies the date that the container content is placed in the container and/or cooler. The at least one daily space may also be used for recording other important information about the container content. In one embodiment, the at least one daily space includes a Monday space 200, a Tuesday space 202, a Wednesday space 204, a Thursday space 206, a Friday space 208, a Saturday space 210, and a Sunday space 212. The appropriate space may be checked or marked as desired to indicate the day of the week that the container content was placed in the container. In this manner, the freshness of the container content, such as meat, seafood, or fruit, may be visually determined at a glance.

In some embodiments, the at least one parameter may include a content identification space 214 for identifying the container content. The content identification space may include an item marking. For example, without limitation, a type of food, such as chicken breasts can be marked to differentiate from chicken thighs in a different container. In some embodiments, the at least one parameter may include a preparation parameter space 216 for identifying a date and a time of preparation of the container content. A checkbox may be used to distinguish between the date and time, and a space for marking numerals may also be available.

In some embodiments, the at least one parameter may include a shelf life space 218 for identifying a shelf life duration for the container content. The shelf life space may include a numeral, an hour checkbox, and a day checkbox for distinguishing the exact date and/or time that the shelf life of the container content has terminated. In some embodiments, the at least one parameter may include an expiration space 220 for identifying an expiration date for said container content. In one embodiment, the expiration space may have a use by identifier to indicate the last date possible for use of the container content. In some embodiments, the at least one parameter may include a preparer identification space 222 for identifying a preparer of said container content. The preparer space may have a user identifier to mark a preparers name with the marker. In this manner, the preparer may be identified if questions arise about the container contents.

Figure 2:
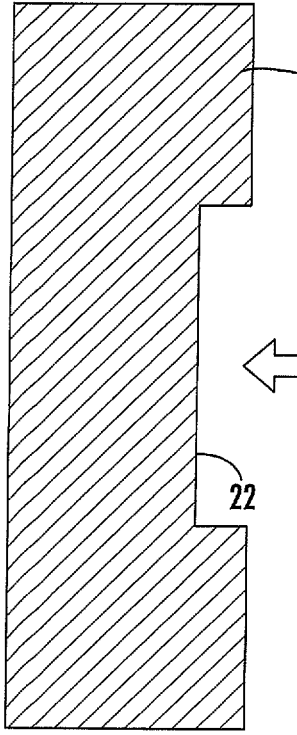
FIG. 2 demonstrates a process of preparing a prepared laminated label for the container.

In a preferred embodiment, the container is formed by a plastic injection molding process. A two part steel mold 20 is prepared. FIG. 2. This mold may be referred to as a label preparation mold. The label preparation mold is used to laminate the label 2 with a plastic that is preferably the same plastic as is used to form the container. The plastic is preferred to be a thermoplastic, such as polycarbonate. The plastic, when cured, is preferred to be transparent, and is sufficiently transparent to allow the indicia, such as logos, illustrations, words, symbols, graphics, spaces and lines to be readily visible to the user through the plastic.

In one embodiment, the label 2 is made from a 10 mil clear Velvet Lexan material. The indicia formed on the label, such as the example shown in FIG. 8 may be printed, such as by screen printing or digital process, and may be formed by four color or full color (CYMK) process. The label may be coated with a dry erase clear coat. The labels may be formed in a continuous sheet and die cut into individual labels.

Figure 3:
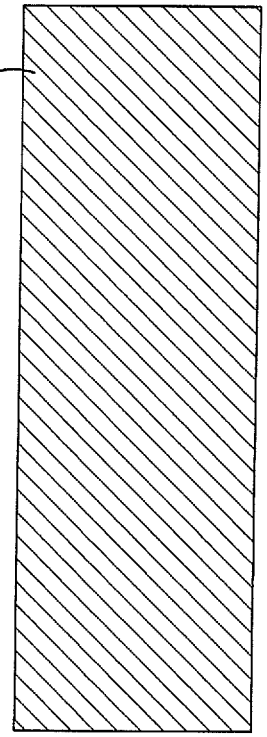
FIG. 3 is a side, sectioned view of a prepared laminated label.

The label may be placed into the label preparation mold cavity 22 and statically held in place. A suction line may be incorporated into the mold that applies negative pressure through the mold and to the mold cavity, thereby statically holding the label in place for lamination. Plastic material, such as a thermoplastic material that will cure to be substantially transparent, is injected into the mold cavity using standard injection molding techniques specific to the thermoplastic, such as polycarbonate material, and to the label cavity used. The part as shown in FIG. 3, the prepared laminated label, is released from the mold. The prepared laminated label 26 comprises label 2 and a plastic coating 24. The label preparation step is important to insure proper positioning of the label within the container into which it is fixed during the container molding process.

Figure 4:
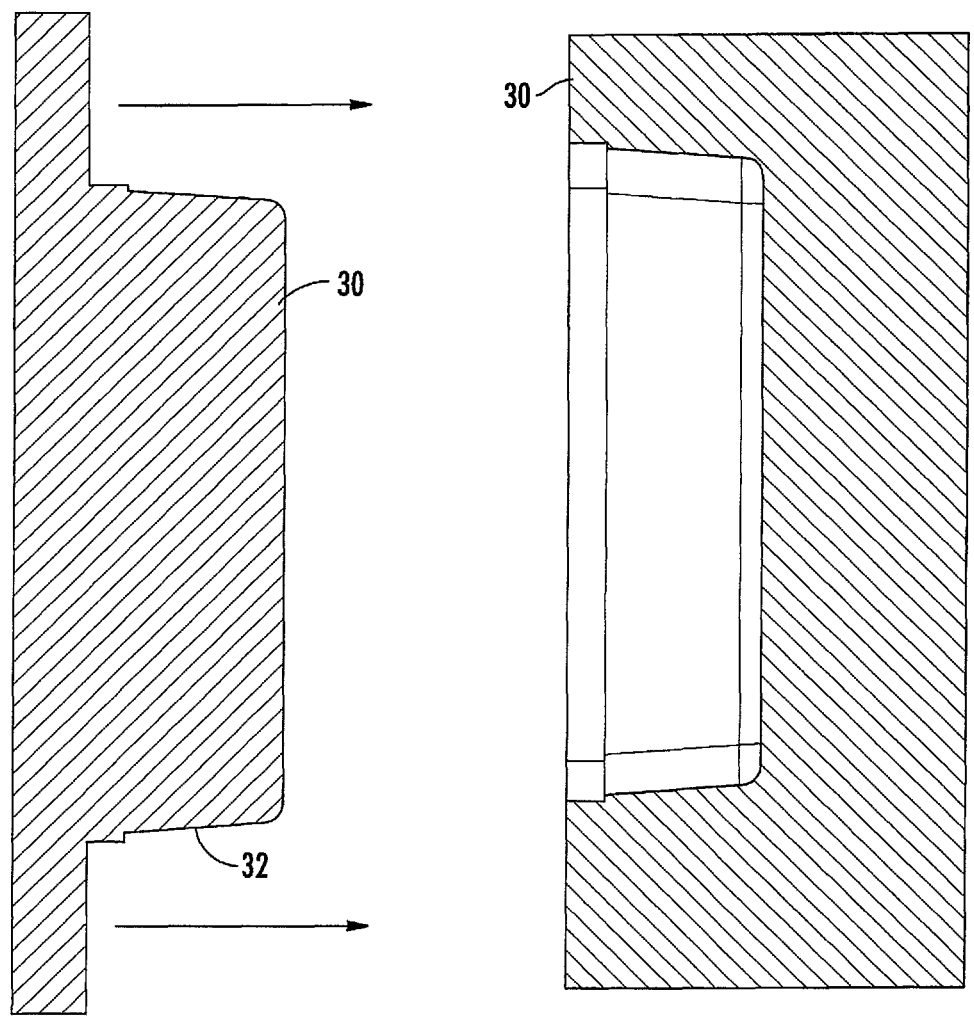
FIG. 4 demonstrates a mold for forming a container according to a preferred embodiment of the invention.

The container 4 may be manufactured by a plastic injection molding process. In one embodiment, the mold is a two part mold 30 as shown in FIG. 4. The container mold is made to specifications to form the container to the size and shape desired, and may vary, for example, by container thickness, length and width.

Figure 5:
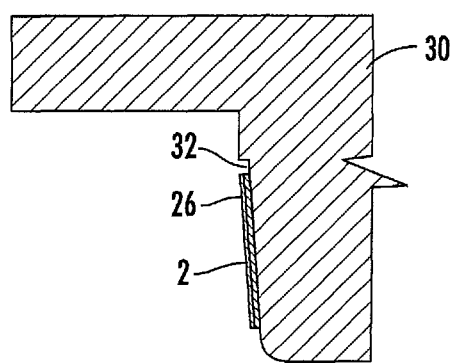
FIG. 5 is a partial view of the prepared laminated label in the mold.

The prepared laminated label is placed into the container mold and statically held in cavity 32 as shown in FIG. 5. Placement of the prepared label placement within the container mold cavity is extremely important. To inhibit movement of the prepared label, vacuum suction may be provided through the mold. Constant suction keeps the prepared label in place during the injection molding process.

Plastic material is fed into a heated barrel, mixed, and forced under pressure into the mold cavity. Plastic resin enters the mold through a sprue. A sprue bushing may be used to seal tightly against the nozzle of the barrel of the molding machine, and allows molten plastic to flow from the barrel into the mold cavity. The sprue bushing directs the molten plastic to the cavity through specifically designed channels that have been formed in each half of the mold bases. These channels control the direction and speed of the molten plastic to obtain the desired result. The mold is designed to maintain the desired flow rate of the molten plastic. The molten plastic flows through two specific channels that lead to each side of the prepared label. As the molten plastic meets the prepared label, the formed plastic melts into the molten plastic creating a seamless bond with the prepared label. Controlling the temperature, pressure, and flow rate is extremely important to obtain the desired bond between the prepared label and the new molten plastic forming the container. The shot size, cycle time, temperature, and pressure must be carefully dialed in when producing the container.

After the mold bases are closed, and the liquid plastic material is injected into the container cavity. The plastic material may be a thermoplastic and may be polycarbonate. The plastic material is preferred to be the same plastic material as used to laminate the label.

Figure 6:
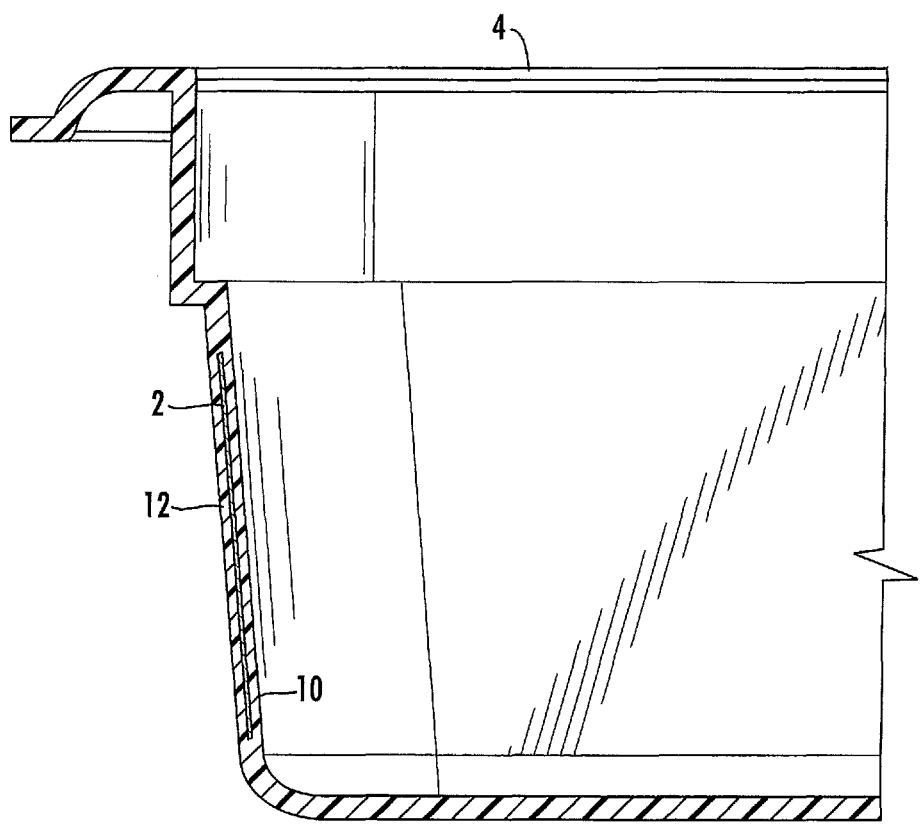
FIG. 6 is a partial sectioned view of a container according to a preferred embodiment of the invention showing the label embedded in the walls of the container.

The container is cooled inside the mold cavities, using standard molding practices, to cure the plastic and form the container. The container is then released and removed from the mold. The end product is a container that is sufficiently transparent to read the completely embedded label. FIG. 6 illustrates a cross sectional view of a completed container showing the embedded label between the inner wall 10 and the outer wall 12 of the container. The container is preferred to be formed from a single plastic material, which may be a thermoplastic that forms the inner wall and the outer wall.

The labeling system may permanently embed a label with a food container, such that the label may be reused for identifying container content and the conditions of the container content. The label remains integrated into the container, such that repetitive removal and manipulation of the label relative to the container for remarking the label is not necessary. In essence, the label records parameters and information about the contents of the container for a period without requiring manipulation of the label or remarking the same label. The label, thus, removes the need for the removable or adhesive backed labels known in the art.

What is claimed is:

1. A storage container, comprising:
    a label comprising indicia permanently formed thereon; and
    an injection molded container comprising a generally vertical wall, the generally vertical wall formed as a single wall of a single plastic material, wherein the label is present in the generally vertical wall of the injection molded container, and wherein the generally vertical wall of the injection molded container comprises an inner wall and an outer wall where the label is present in the generally vertical wall of the injection molded container, the label positioned between and forming the inner wall and the outer wall in the generally vertical wall of the injection molded container;
    wherein the outer wall of the injection molded container is sufficiently transparent to visually reveal the permanent indicia formed on the label through the outer wall of the injection molded container, and wherein the injection molded container is wider at a top opening of the injection molded container than at a bottom of the injection molded container.

2. A storage container as described in claim 1, wherein an outer surface of the outer wall of the injection molded container displays temporary indicia formed over the label by an erasable marker.

3. A storage container as described in claim 1, wherein the label comprises a substrate that is laminated with a plastic material, and the plastic material laminated to the label is bonded to the plastic material of the injection molded container.

4. A storage container as described in claim 1, wherein the label comprises a substrate that is laminated with a thermoplastic material, and the injection molded container is formed of the same thermoplastic material as the label, and the thermoplastic material laminated to the label is thermally bonded to the thermoplastic material of the injection molded container.

5. A storage container as described in claim 1, wherein the label comprises a substrate that is laminated with a polycarbonate, and the injection molded container is formed of polycarbonate, and the polycarbonate material laminated to the label is bonded to the polycarbonate of the injection molded container.

6. A storage container as described in claim 1, wherein the label comprises a substrate that is laminated with the single plastic material from which the generally vertical wall of the injection molded container if formed, and the plastic material laminated to the label is thermally bonded to the plastic material of the injection molded container.

7. A storage container as described in claim 1, wherein the sufficiently transparent outer wall of the injection molded container that covers the label has a smooth exterior surface.

8. A storage container as described in claim 1, wherein the permanent indicia formed on the label comprises a plurality of lines, and wherein each line has a parameter permanently formed adjacent to each line of the plurality of lines wherein the parameter indicates information that is pertinent to contents of the injection molded container, and wherein the wherein the outer wall of the injection molded container is sufficiently transparent to visually reveal the plurality of lines.

9. A storage container as described in claim 1, wherein the label is formed of a plastic material and the generally vertical wall of the injection molded container is formed of the same plastic material as the label, and the plastic material of the label is thermally bonded to the plastic material of the injection molded container.

10. A storage container as described in claim 1, wherein the label is formed of a plastic material that bonds to the single plastic material of the injection molded container.

11. A storage container as described in claim 1, wherein an outer surface of the outer wall of the injection molded container that is formed by the label is flat and the outer surface of the outer wall displays temporary and erasable indicia formed over the label by an erasable marker.

12. A storage container as described in claim 1, wherein the label comprises a plurality of lines permanently formed thereon, and wherein each line has a parameter pertinent to contents of the injection molded container adjacent to each line of the plurality of lines, and wherein the outer wall of the injection molded container is sufficiently transparent to visually reveal the plurality of lines, and wherein the outer wall of the injection molded container that covers the plurality of lines is substantially flat.

13. A storage container as described in claim 1, wherein the generally vertical wall of the injection molded container comprises an inner wall and an outer wall only where the label is present, and the label forms the inner wall and the outer wall in the generally vertical wall of the injection molded container.

14. A storage container as described in claim 1, wherein the permanent indicia formed on the label comprises a plurality of lines, and wherein the plurality of lines each comprise parameters pertinent to contents of the injection molded container permanently formed adjacent to each line of the plurality of lines, and wherein the plurality of parameters comprise inquiries about the container content, content expiration date, and content preparer information;
    wherein the outer wall of the injection molded container formed in the generally vertical wall of the container by the label is sufficiently transparent to visually reveal the permanent indicia formed on the label.

15. A storage container as described in claim 1, wherein the permanent indicia formed on the label comprises a plurality of lines, and wherein the plurality of lines comprise parameters pertinent to contents of the injection molded container formed adjacent to each line of the plurality of lines, and wherein the plurality of parameters comprise inquiries about the container content, content expiration date, and content preparer information;
    wherein the outer wall of the injection molded container formed in the generally vertical wall of the container by the label is sufficiently transparent to visually reveal the permanent indicia formed on the label, and wherein an outer surface of the outer wall of generally vertical wall of the injection molded container displays temporary indicia formed over the plurality of lines of the label by an erasable marker.

* * * * *